US011089179B2

(12) United States Patent
Higuchi

(10) Patent No.: US 11,089,179 B2
(45) Date of Patent: Aug. 10, 2021

(54) IMAGE PROCESSING APPARATUS, SYSTEM, AND COMPUTER PROGRAM PRODUCT CAPABLE OF PERFORMING IMAGE PROCESSING ON TARGET IMAGE WITH RESPECT TO IMAGE DATA OF THE TARGET IMAGE CORRESPONDING TO TARGET IMAGE STATE BY ACQUIRED DISPLAY IMAGE

(71) Applicant: FUJIFILM Business Innovation Corp., Tokyo (JP)

(72) Inventor: Tatsuya Higuchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/521,563

(22) Filed: Jul. 24, 2019

(65) Prior Publication Data
US 2020/0288037 A1 Sep. 10, 2020

(30) Foreign Application Priority Data
Mar. 8, 2019 (JP) .............................. JP2019-042290

(51) Int. Cl.
*H04N 1/32* (2006.01)
*H04N 1/387* (2006.01)
(Continued)

(52) U.S. Cl.
CPC ..... *H04N 1/32219* (2013.01); *H04N 1/00005* (2013.01); *H04N 1/00039* (2013.01);
(Continued)

(58) Field of Classification Search
CPC .. H04N 1/393; H04N 1/3935; H04N 1/33315; H04N 1/3871; H04N 1/40068; H04N 1/0402–0458; H04N 1/00005; H04N 1/00015; H04N 1/00023; H04N 1/00031; H04N 1/00034; H04N 1/00039; H04N 1/00042; H04N 1/00068; H04N 1/00082; H04N 1/00087; H04N 1/0009; H04N 1/6011; H04N 1/6013; H04N 1/603; H04N 1/622; G06K 15/1873; G06K 15/1874; G06K 15/1876; G06K 15/1877; G06K 15/025; G06K 15/026; G06T 3/40–4092
See application file for complete search history.

(56) References Cited

U.S. PATENT DOCUMENTS 4,868,672 A * 9/1989 Hiroki ................ H04N 1/00588
358/494
9,025,212 B2 5/2015 Tanaka
(Continued)

FOREIGN PATENT DOCUMENTS

| JP | 2006254224 | 9/2006 |
|----|------------|--------|
| JP | 2012093903 | 5/2012 |
| JP | 2014116907 | 6/2014 |

*Primary Examiner* — Scott A Rogers
(74) *Attorney, Agent, or Firm* — JCIPRNET

(57) ABSTRACT

An image processing apparatus includes a unit that acquires image data of a target image which is a target of image processing, a unit that acquires a display image showing a target image state, and a unit that performs image processing corresponding to the target image state with respect to the image data of the target image, based on the acquired display image.

21 Claims, 9 Drawing Sheets

(51) Int. Cl.
*H04N 1/00* (2006.01)
*H04N 1/393* (2006.01)
(52) U.S. Cl.
CPC ..... *H04N 1/00082* (2013.01); *H04N 1/00129* (2013.01); *H04N 1/3875* (2013.01); *H04N 1/3877* (2013.01); *H04N 1/393* (2013.01); *H04N 1/00867* (2013.01); *H04N 2201/0081* (2013.01)

(56) References Cited

U.S. PATENT DOCUMENTS

2015/0078627 A1* 3/2015 Fukase .................... G06T 7/001
  382/112
2018/0115671 A1* 4/2018 Kunihiro ............ H04N 1/00822

* cited by examiner

IMAGE PROCESSING APPARATUS, SYSTEM, AND COMPUTER PROGRAM PRODUCT CAPABLE OF PERFORMING IMAGE PROCESSING ON TARGET IMAGE WITH RESPECT TO IMAGE DATA OF THE TARGET IMAGE CORRESPONDING TO TARGET IMAGE STATE BY ACQUIRED DISPLAY IMAGE

CROSS-REFERENCE TO RELATED APPLICATIONS

This application is based on and claims priority under 35 USC 119 from Japanese Patent Application No. 2019-042290 filed Mar. 8, 2019.

BACKGROUND

(i) Technical Field

The present invention relates to an image processing apparatus, an image processing system, and a non-transitory computer readable medium storing a program.

(ii) Related Art

JP2014-116907A describes a scanner device that has a first mode in which a normal target object placed on a document table is read and a second mode in which a light emitting target object placed on the document table is read. The scanner apparatus in JP2014-116907A detects light from the target object placed on the document table and switches a reading mode to the first mode or the second mode based on the result of the detection.

In addition, JP2012-093903A describes an information terminal apparatus that is devised on the premise of a sheet-through type image reading apparatus that reads a document at a fixed reading position while transporting the document. In JP2012-093903A, a display screen of the information terminal apparatus is disposed at the fixed reading position of the image reading apparatus, the information terminal apparatus is caused to scroll-display the contents of the display screen, and the image reading apparatus is caused to read the contents of the display screen such that an image forming apparatus can record the contents on a recording paper sheet.

In addition, JP2006-254224A describes an image processing system in which each of an electronic book terminal and a copying machine is provided an communication interface such that the electronic book terminal and the copying machine can communicate with each other, a control unit of the copying machine notifies the electronic book terminal of a page display request after an image displayed on a display unit is read by a scanner, and a control unit of the electronic book terminal notifies the copying machine of page display completion after updating the image displayed on the display unit in a case where the control unit is notified of the page display request.

SUMMARY

As described in JP2014-116907A, JP2012-093903A, and JP2006-254224A, in the related art, a technique of reading a display image on a display device, a paper sheet, or the like by means of a scanner device or the like has been known, for example. For example, in a case where it is desired to realize the image state of a target image shown in the display image as it is, it is sufficient to form an image based on scan data which is obtained in a case where the display image is read by the scanner device.

However, for example, the processing result of image processing with respect to the scan data of the display image in which the target image is shown may result in an image quality or the like lower than the image quality of the processing result of image processing with respect to image data of the target image (for example, original image data used for formation of display image).

Aspects of non-limiting embodiments of the present disclosure relate to an image processing apparatus, an image processing system, and a non-transitory computer readable medium storing a program with which it is possible to realize a target image state shown in a display image by means of image processing with respect to image data of a target image.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image processing apparatus which includes a unit that acquires image data of a target image which is a target of image processing, a unit that acquires a display image showing a target image state, and a unit that performs image processing corresponding to the target image state with respect to the image data of the target image, based on the acquired display image.

BRIEF DESCRIPTION OF THE DRAWINGS

Exemplary embodiment(s) of the present invention will be described in detail based on the following figures, wherein.

DETAILED DESCRIPTION

Figure 1:
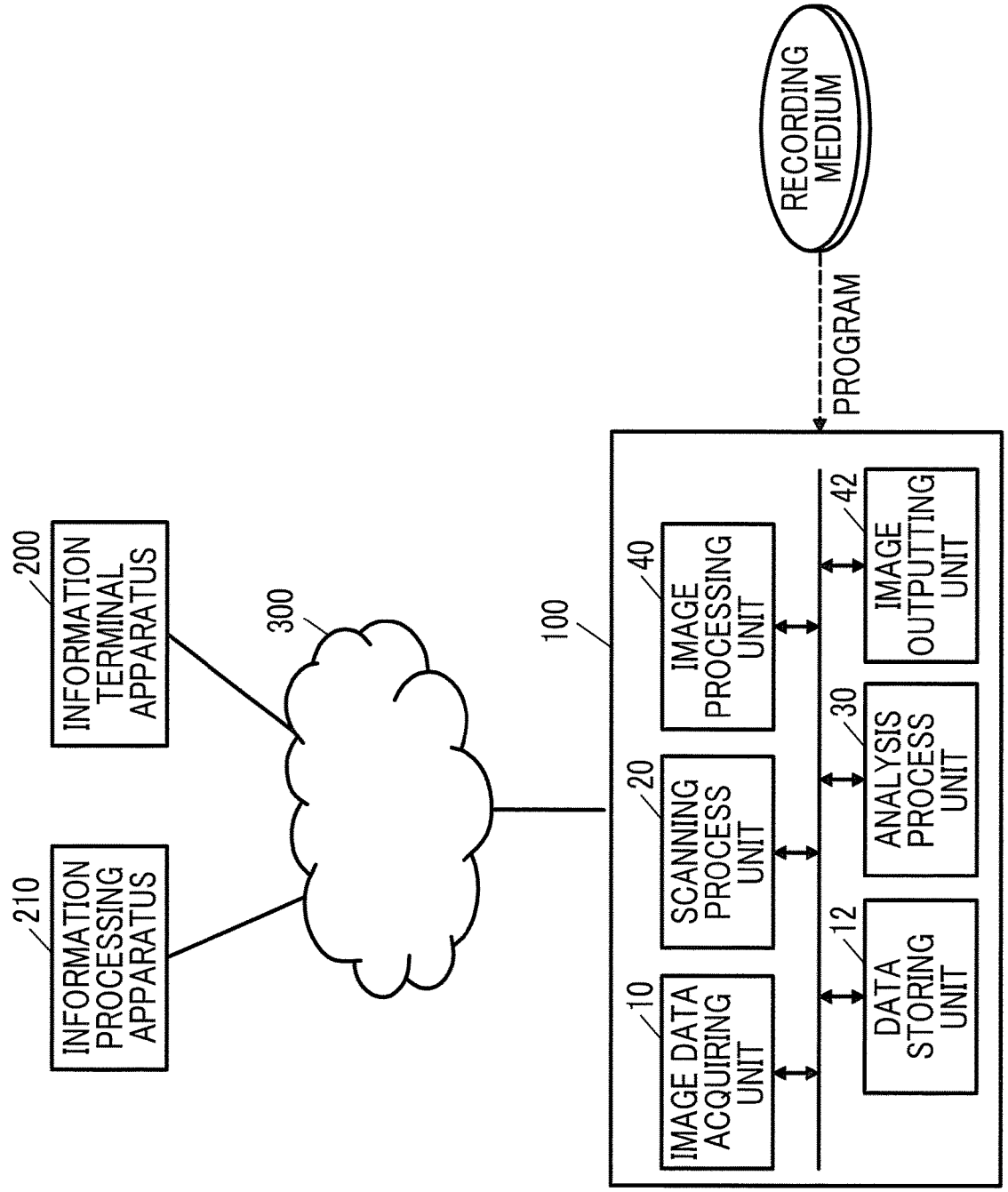
FIG. 1 is a diagram illustrating a specific example of an image processing system.

FIG. 1 is a diagram illustrating an example of a specific exemplary embodiment of the present invention. FIG. 1 illustrates a specific example of an image processing system provided with an image processing apparatus 100 and an information terminal apparatus 200. In the specific example shown in FIG. 1, the image processing apparatus 100 and the information terminal apparatus 200 are connected to each other via a communication line 300 which uses at least one of wireless communication or wired communication and exchange data (information) with each other, for example. Note that, as in the specific example shown in FIG. 1, an information processing apparatus 210 may exchange data with the image processing apparatus 100 via the communication line 300.

In the specific example shown in FIG. 1, the image processing apparatus 100 is provided with an image data acquiring unit 10, a scanning process unit 20, an analysis process unit 30, and an image processing unit 40. In addition, as shown in FIG. 1, the image processing apparatus 100 may be provided with a data storing unit 12 and an image outputting unit 42.

The image data acquiring unit 10 acquires image data of a target image which is the target of image processing. The image data acquiring unit 10 may acquire the image data of the target image from the information terminal apparatus 200 or the information processing apparatus 210 via the communication line 300. In addition, the image data acquired by the image data acquiring unit 10 may be stored in the data storing unit 12.

The scanning process unit 20 acquires scan data of a display image showing a target image state related to the target image. The scanning process unit 20 acquires the scan data of the display image by optically reading the display image, for example. The scanning process unit 20 may acquire scan data of an image (including image composed of test or symbol only) on a document such as a paper sheet by optically reading the image by means of a scanner or a digital camera. In addition, the scanning process unit 20 may acquire scan data of an image on a light emitting display device by optically reading the image.

The analysis process unit 30 determines image processing corresponding to the target image state by analyzing the scan data. The analysis process unit 30 analyzes the scan data acquired by the scanning process unit 20, for example. In other words, the analysis process unit 30 analyzes the scan data of the display image showing the target image state related to the target image. In this manner, the analysis process unit 30 determines image processing corresponding to the target image state shown in the display image.

The image processing unit 40 performs the image processing corresponding to the target image state with respect to the image data of the target image. The image processing unit 40 performs the image processing determined by the analysis process unit 30, that is, the image processing corresponding to the target image state related to the target image with respect to the image data of the target image acquired by the image data acquiring unit 10.

An image obtained through the image processing performed by the image processing unit 40 may be output from the image outputting unit 42. For example, the image outputting unit 42 may output the image obtained through the image processing performed by the image processing unit 40 by printing the image on a medium such as a paper sheet. In addition, the image outputting unit 42 may store data of the image obtained through the image processing performed by the image processing unit 40 in the data storing unit 12 and may transmit the data to the outside of the image processing apparatus 100.

The image processing apparatus 100 shown in FIG. 1 may be realized by using one or more computers. The computer is provided with hard resources such as a calculation device such as a CPU, a storage device such as a memory or a hard disk, a communication device which uses a communication line such as the Internet, a device that reads data from a recording medium such as an optical disk, a semiconductor memory, or a card memory and writes the data, a display device such as a display, and an operation device that receives an operation from a user.

In addition, for example, a program (software) corresponding to the functions of at least a portion of a plurality of components, which are provided in the image processing apparatus 100 shown in FIG. 1 and are given reference numerals, may be read by the computer and at least a portion of the functions of the image processing apparatus 100 shown in FIG. 1 may be realized by the computer with cooperation between the hardware resources of the computer and the software read by the computer. The program may be provided to the computer (image processing apparatus 100) via a communication line such as the Internet and may be provided to the computer (image processing apparatus 100) by being stored in a recording medium such as an optical disk, a semiconductor memory, or a card memory, for example.

In addition, the image processing apparatus 100 shown in FIG. 1 may be a composite apparatus provided with a plurality of image outputting functions (at least any of printing function, scanning function, copying function, facsimile function, and like). For example, in a case where the image processing apparatus 100 in FIG. 1 is a composite apparatus, the image processing apparatus 100 may be installed in a company or a school such that the image processing apparatus 100 is used by a customer of the company or the school and the image processing apparatus 100 may be installed in a store such as a convenience store such that the image processing apparatus 100 is used by unspecified customers.

In the specific example shown in FIG. 1, the information terminal apparatus 200 and the information processing apparatus 210 are user devices that a user of the image processing system shown in FIG. 1 uses. Specific examples of the information terminal apparatus 200 include a portable device such as a smart phone or a tablet terminal. In addition, specific examples of the information processing apparatus 210 include a device such as a personal computer.

The entire configuration of the image processing system shown in FIG. 1 is as described above. Next, a specific example of the image processing or the like realized by the image processing system in FIG. 1 will be described in detail. Note that, with regard to the components shown in FIG. 1, the reference numerals in FIG. 1 will be used in the following description.

Figure 2:
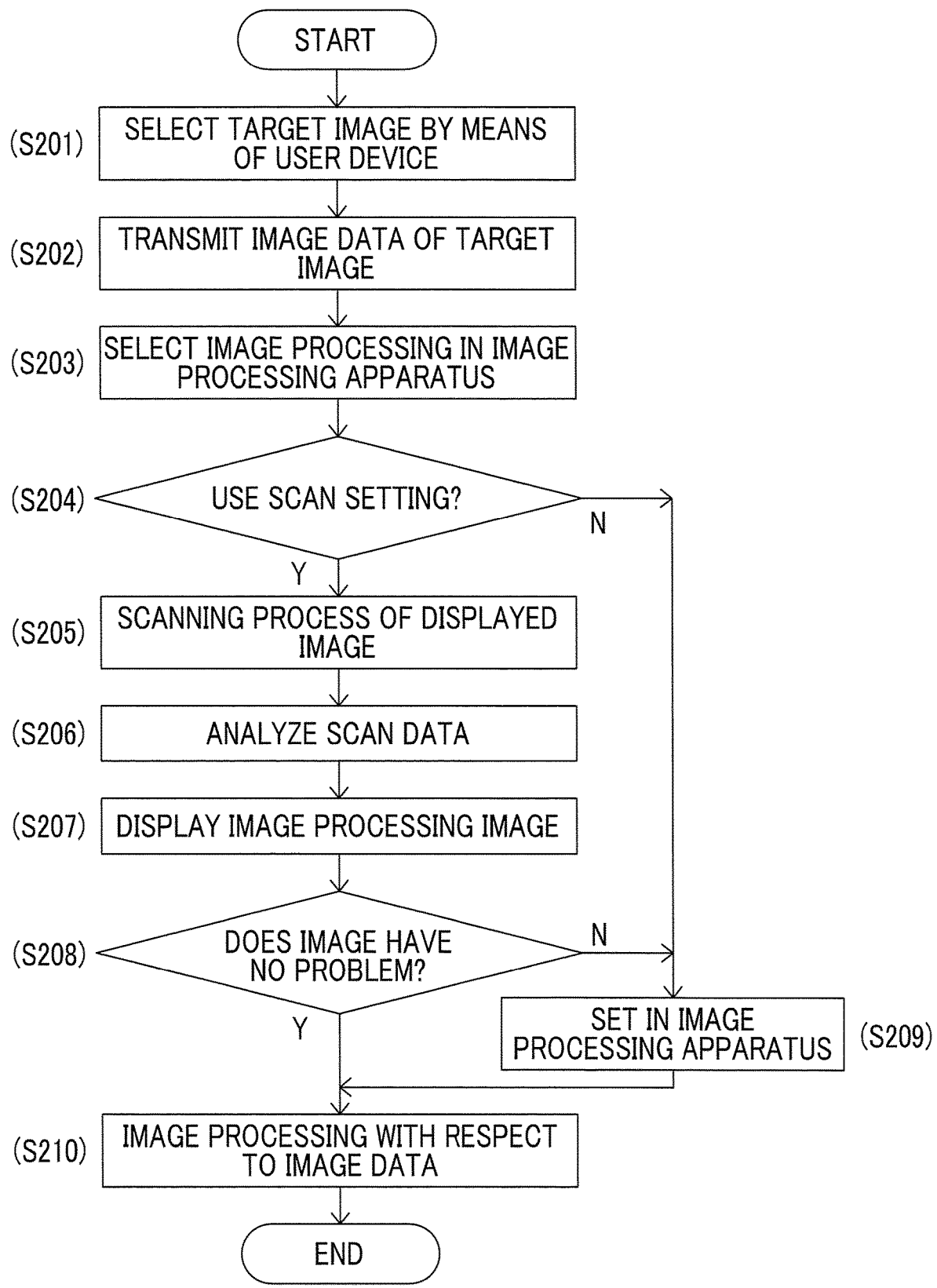
FIG. 2 is a diagram illustrating a specific example of image processing performed by the image processing system in FIG. 1.

FIG. 2 is a diagram (flowchart) illustrating a specific example of the image processing performed by the image processing system in FIG. 1. In a case where a process as in the flowchart shown in FIG. 2 is started, first, a target image is selected by means of the user devices (S201). For example, the user using the image processing system in FIG. 1 causes the information terminal apparatus 200 or the information processing apparatus 210 to display images and selects the target image which is the target of the image processing.

Next, image data of the target image is transmitted (S202). For example, the user who has selected the target image in S201 transmits the image data of the selected target image to the image processing apparatus 100 from the information terminal apparatus 200 or the information processing apparatus 210, via the communication line 300. The transmitted image data of the target image is received by the image data acquiring unit 10 of the image processing apparatus 100 and is stored in the data storing unit 12.

In addition, for example, in the case of a usage pattern where the image data of the target image is transmitted while the user is at a position far from the image processing apparatus 100, the user moves to the installation position of the image processing apparatus 100 (for example, store such as convenience store) after the transmission of the image data. Note that, the image data of the target image may be transmitted to the image processing apparatus 100 from the information terminal apparatus 200 such as a smart phone or a tablet terminal while the user is at the installation position of the image processing apparatus 100. The image data of the target image is transmitted to the image processing apparatus 100 before the image processing performed by the image processing apparatus 100, of which the target is the image data, is performed.

In a case where the image data of the target image is transmitted, the image processing is selected in the image processing apparatus 100 (S203). For example, the user who has transmitted the image data of the target image operates an operation panel or the like of the image processing apparatus 100 to select an image processing function of the image processing apparatus 100.

Next, it is determined whether scan settings are used or not (S204). For example, the user who has selected the image processing function operates the operation panel of the image processing apparatus 100 to determine whether to use the scan settings, which will be described later, or not.

In a case where the scan settings are used, first, a scanning process of a display image is performed (S205). Accordingly, scan data of the display image showing a target image state related to the target image is acquired. For example, the user causes a display device of the information terminal apparatus 200 to display the display image showing the target image state related to the target image and causes the scanning process unit 20 of the image processing apparatus 100 to read the display image displayed on the display device such that the scanning process is performed.

Note that, the display image showing the target image state related to the target image may be printed on a medium such as a paper sheet, for example. In a case where the display image is printed on a paper sheet or the like, the user causes the scanning process unit 20 of the image processing apparatus 100 to read the display image on the paper sheet such that the scanning process is performed.

In a case where the scanning process of the display image is performed and the scan data of the display image is acquired, analysis of the scan data is performed (S206). For example, the analysis process unit 30 of the image processing apparatus 100 analyzes the scan data to determine the image processing corresponding to the target image state. The analysis process unit 30 analyzes the scan data acquired by the scanning process unit 20. In other words, the analysis process unit 30 analyzes the scan data of the display image showing the target image state related to the target image. Accordingly, the analysis process unit 30 determines the image processing corresponding to the target image state.

Next, an image processing image is displayed (S207) and it is confirmed whether the image processing image has no problem or not (S208). For example, an image showing a resultant image, which is the result of the image processing determined by the analysis process unit 30, is displayed on a display device or the like of the image processing apparatus 100. Then, the user confirms whether the displayed resultant image has no problem or not and make an instruction to perform the image processing by operating the operation panel of the image processing apparatus 100 in a case where there is no problem, for example.

In a case where it is confirmed that the display image processing image has no problem, the image processing with respect to the image data of the target image is performed (S210). For example, the image processing unit 40 of the image processing apparatus 100 performs the image processing determined by the analysis process unit 30 with respect to the image data of the target image acquired by the image data acquiring unit 10. Accordingly, the image processing corresponding to the target image state related to the target image is performed with respect to the image data of the target image. In a case where the image processing in S210 is finished, the process as in the flowchart shown in FIG. 2 is terminated.

In S210, the image processing, of which the target is the image data of the target image (for example, original image data used for formation of display image) instead of the scan data of the display image showing the target image, is performed. Therefore, the result of the processing in S210 which is obtained through the image processing with respect to the image data of the target image results in a high quality in terms of image quality or the like in comparison with the result of processing which is obtained through the image processing with respect to the scan data of the display image showing the target image.

In addition, for example, in the case of a usage pattern where the user causes the display image showing the target image state related to the target image to be formed by means of the information terminal apparatus 200 with which the user is familiar, an operation load on the user is reduced in comparison with a case where the target image state is set by means of the image processing apparatus 100 with which the user is not familiar and thus there is improvement in operability.

Note that, in a case where the scan settings are not used in S204, a setting operation is performed in the image processing apparatus 100 (S209). For example, the user who has determined not to use the scan settings in S204 operates the operation panel or the like of the image processing apparatus 100 while checking the image state of the target image displayed on the display device of the image processing apparatus 100 to set parameters of the image processing performed by the image processing unit 40 of the image processing apparatus 100 such that the target image state related to the target image is realized. In addition, in a case where the resultant image has a problem in S208 as well, the setting operation is performed in the image processing apparatus 100 (S209).

In a case where the setting operation in the image processing apparatus 100 is performed in S209, the image processing with respect to the image data of the target image is performed in accordance with the contents of the setting operation (S210). For example, the image processing unit 40 of the image processing apparatus 100 performs the image processing with respect to the image data of the target image acquired by the image data acquiring unit 10 in accordance with the parameters or the like set in S209.

In addition, in the flowchart shown in FIG. 2, the process in S207 and the process in S208 may be omitted. For example, the image processing with respect to the image data of the target image in S210 may be performed after the scanning process of the display image in S205 is performed such that the scan data of the display image is acquired and the analysis of the scan data in S206 is performed. In addition, the scanning process of the display image may be performed before the transmission of the image data of the target image such that the image data of the target image is transmitted after the scanning process of the display image.

In addition, in the scanning process in S205 in the flowchart shown in FIG. 2, data (for example, low-quality data corresponding to scan data) of the display image displayed on the display device of the information terminal apparatus 200 may be transferred to the image processing apparatus 100 from the information terminal apparatus 200 through data communication. For example, in a case where the information terminal apparatus 200 and the image processing apparatus 100 are provided with a function related to short-range communication such as near field communication (NFC), the data of the display image may be transferred to the image processing apparatus 100 from the information terminal apparatus 200 through short-range communication.

Next, a specific example of the image processing realized by the image processing system in FIG. 1 will be described. FIGS. 3 to 9 illustrate several specific examples related to the image processing realized by the image processing system in FIG. 1. FIGS. 3 to 9 illustrate a specific example of the image data of the target image which is the target of the image processing, a specific example of the display image showing the target image state related to the target image, and a specific example of the result of the image processing which is obtained in a case where the image processing corresponding to the target image state shown in the display image is performed on the image data of the target image.

Figure 3:
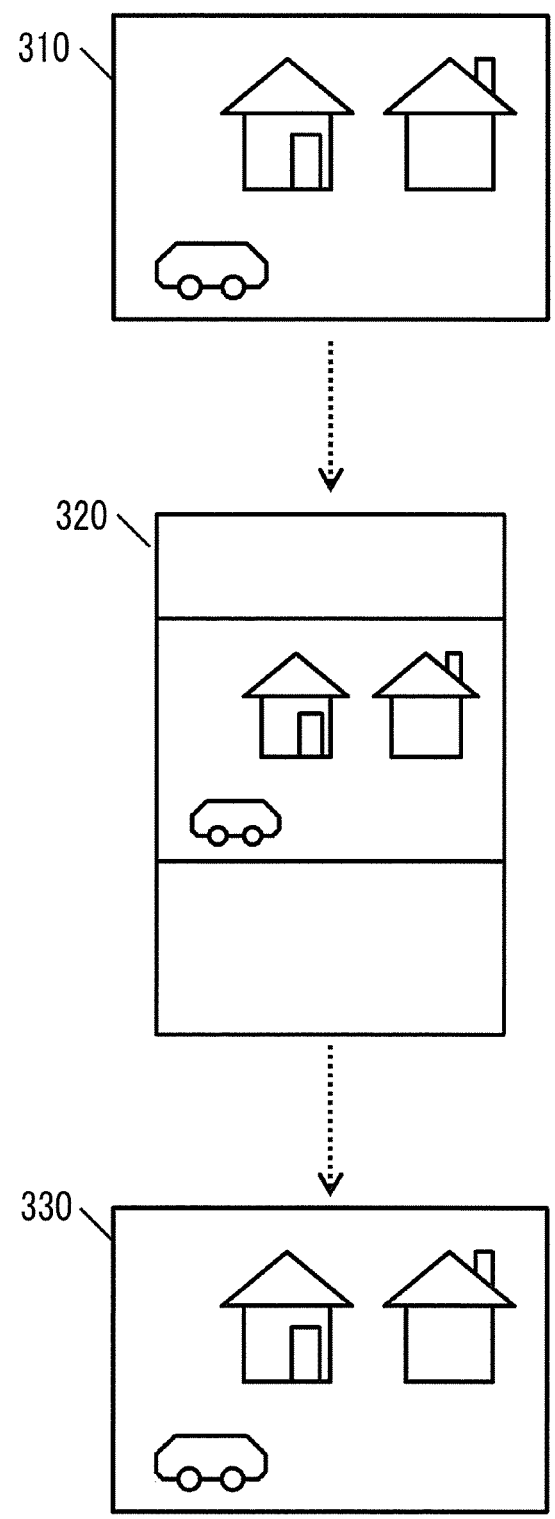
FIG. 3 is a diagram illustrating a basic specific example of the image processing with respect to a target image.

FIG. 3 is a diagram illustrating a basic specific example of the image processing with respect to the target image. FIG. 3 illustrates a specific example of image data 310 of a target image which is the target of the image processing. In addition, FIG. 3 illustrates a specific example of a display image 320 which shows the image contents of the image data 310 as it is, as the target image state related to the target image.

Therefore, for example, in a case where scan data of the display image 320 shown in FIG. 3 is obtained as the scan data of the display image showing the target image state related to the target image, an image processing result 330 shown in FIG. 3, which shows the image contents of the image data 310 as it is, is obtained as the result of the image processing corresponding to the target image state shown in the display image 320 which is performed with respect to the image data 310.

Figure 4:
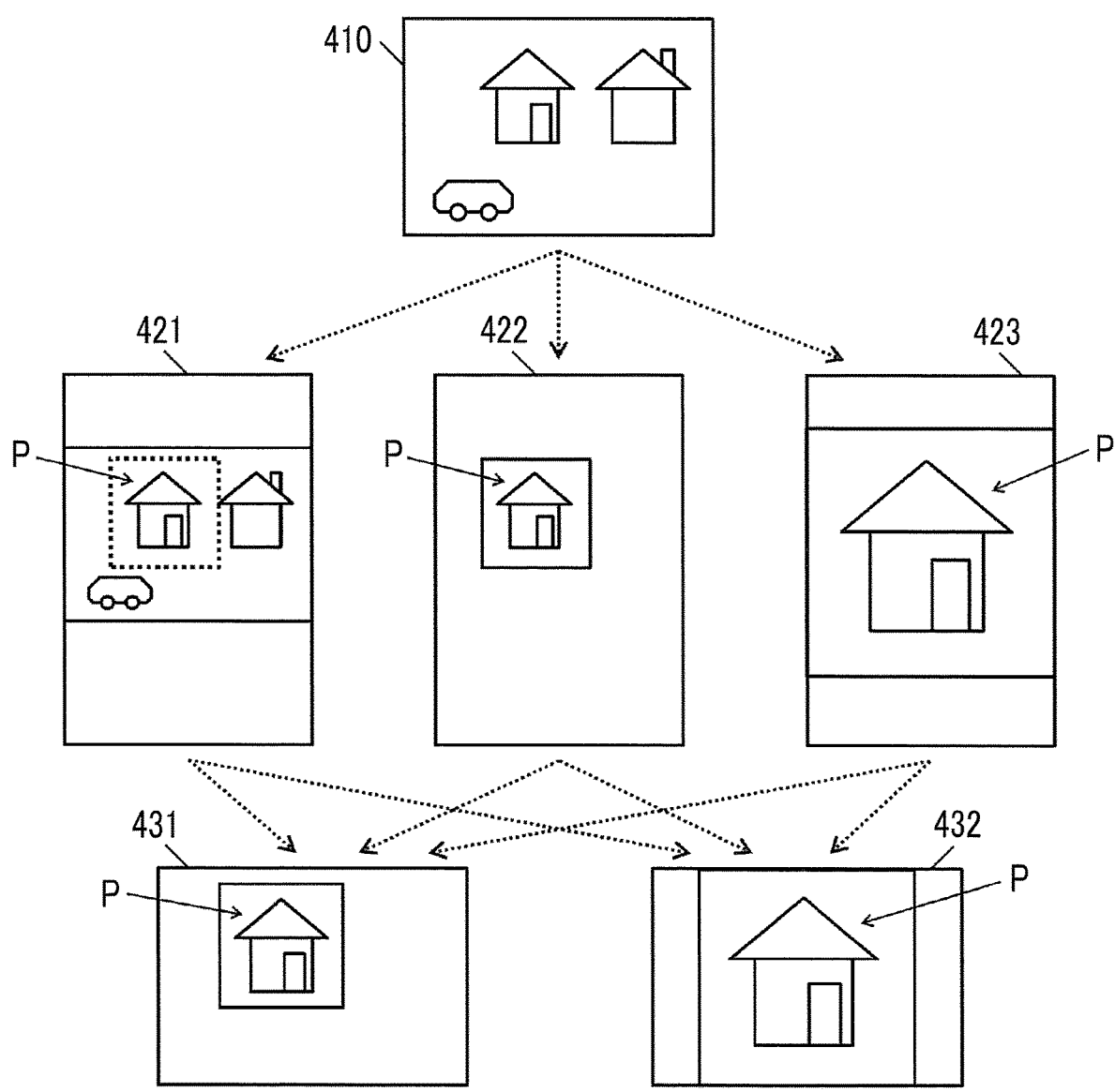
FIG. 4 is a diagram illustrating a specific example of image processing with respect to a partial image which is a portion of the target image.

FIG. 4 is a diagram illustrating a specific example of image processing with respect to partial images, each of which is a portion of the target image. FIG. 4 illustrates a specific example of image data 410 of the target image which is the target of the image processing. In addition, FIG. 4 illustrates specific examples of display images 421, 422, and 423 which show partial images P, each of which is a portion of the target image, as the target image state related to the target image.

In the display image 421, the partial image P which is a portion of the target image is represented by a layout frame (rectangular shape formed by broken lines in specific example in FIG. 4). For example, in a case where scan data of the display image 421 shown in FIG. 4 is obtained, the image processing unit 40 of the image processing apparatus 100 performs image processing in which data corresponding to the partial image P in the layout frame is extracted from the image data 410 (for example, trimming process) and the partial image P is formed.

In this manner, an image processing result 431 may be obtained from the image data 410 and the display image 421 or an image processing result 432 may be obtained from the image data 410 and the display image 421 as shown in FIG. 4. In the specific example shown in FIG. 4, the image processing result 431 is the result of processing in which only the partial image P is shown without a change in size of the partial image P (without change in relative size thereof in target image, for example). Meanwhile, the image processing result 432 is the result of processing in which only the partial image P is shown with the size of the partial image P increased (for example, increased to size larger than relative size thereof in target image).

In addition, in the display image 422, the partial image P, which is a portion of the target image, is shown without a change in size (without change in relative size in target image, for example). For example, in a case where scan data of the display image 422 shown in FIG. 4 is obtained, the image processing unit 40 performs image processing in which data corresponding to the partial image P is extracted from the image data 410 and the partial image P is formed. In this manner, the image processing result 431 may be obtained from the image data 410 and the display image 422 or the image processing result 432 may be obtained from the image data 410 and the display image 422 as shown in FIG. 4.

In addition, in the display image 423, the partial image P, which is a portion of the target image, is shown with the size thereof increased (for example, increased to size larger than relative size in target image). For example, in a case where scan data of the display image 423 shown in FIG. 4 is obtained as well, the image processing unit 40 performs image processing in which data corresponding to the partial image P is extracted from the image data 410 and the partial image P is formed. In this manner, the image processing result 431 may be obtained from the image data 410 and the display image 423 or the image processing result 432 may be obtained from the image data 410 and the display image 423 as shown in FIG. 4.

Figure 5:
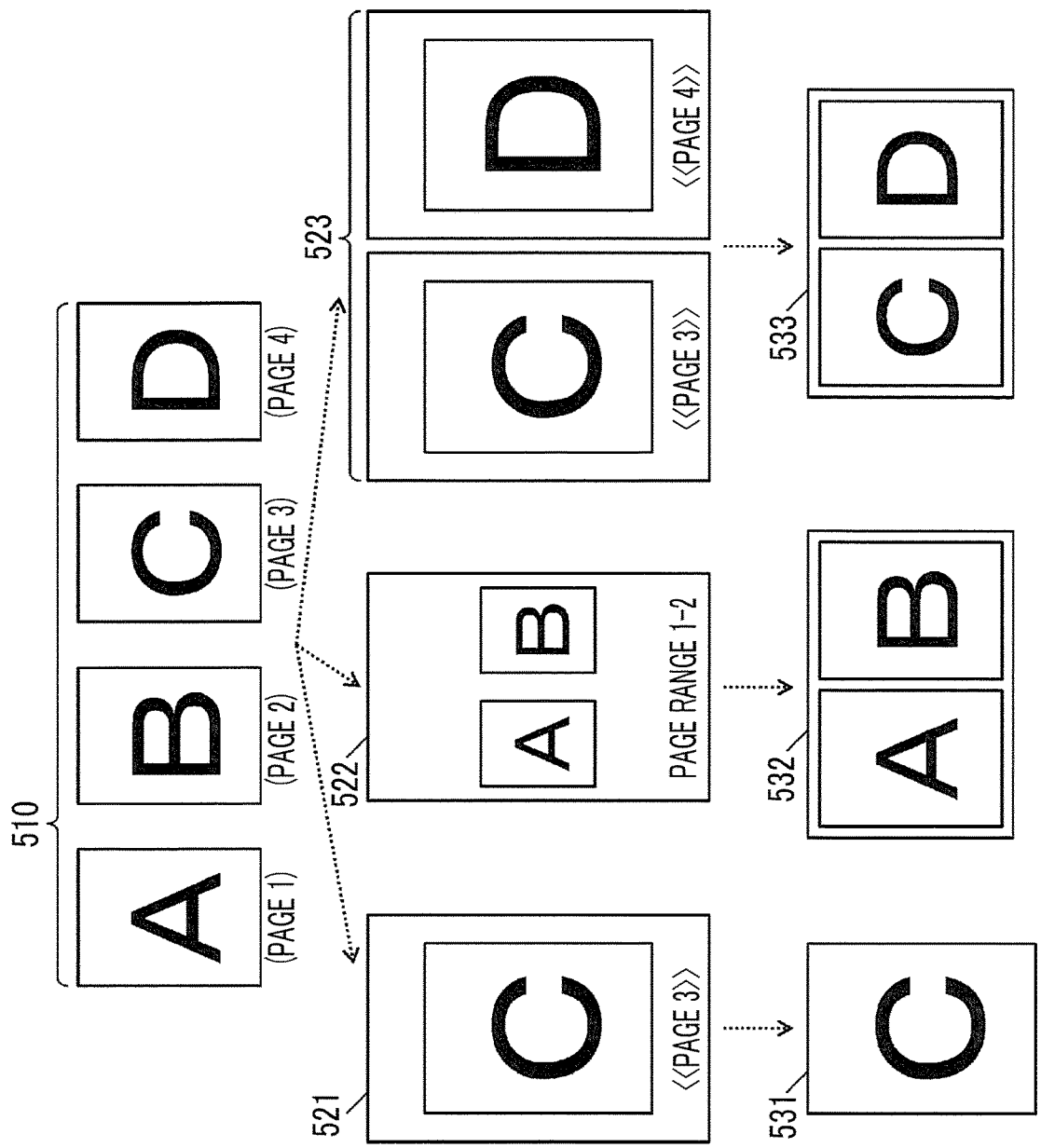
FIG. 5 is a diagram illustrating a specific example of image processing with respect to a target image including a plurality of pages.

FIG. 5 is a diagram illustrating a specific example of image processing with respect to a target image including a plurality of pages. FIG. 5 illustrates a specific example of image data 510 related to the target image including the plurality of pages. FIG. 5 illustrates the image data 510 of the target image including the plurality of pages, which are pages 1 to 4.

In addition, FIG. 5 illustrates specific examples of display images 521, 522, and 523 each of which shows at least a portion of the pages in the target image including the plurality of pages, as the target image state related to the target image.

The display image 521 is a specific example of a display image which shows at least a portion of the pages in the target image including the plurality of pages. The display image 521 shown in FIG. 5 shows the page 3, which is a portion of the pages in the target image including the pages 1 to 4. For example, in a case where scan data of the display image 521 shown in FIG. 5 is obtained, the image processing unit 40 of the image processing apparatus 100 performs image processing in which data corresponding to the page 3 is extracted from the image data 510 and an image corresponding to the page 3 is formed.

In this manner, an image processing result 531 in which the image corresponding to the page 3 is shown is obtained from image data 510 and the display image 521, as shown in FIG. 5.

In addition, the display image 522 is a specific example of a display image which shows N pages (N is natural number), each of which is at least a portion of the target image including the plurality of pages. The display image 522 shown in FIG. 5 shows two pages, which are the page 1 and the page 2 (page range of 1 to 2) in the target image including the pages 1 to 4.

For example, in a case where scan data of the display image 522 shown in FIG. 5 is obtained, the image processing unit 40 performs image processing in which data corresponding to the page 1 and the page 2 is extracted from the image data 510 and images corresponding to the page 1 and the page 2 are formed. The image processing unit 40 may form an aggregation image in which N images corresponding to the N pages (N is natural number) are shown within one page.

For example, an image processing result 532 in which an image of the page 1 and an image of the page 2 are shown within one page may be obtained from the image data 510 and the display image 522, as shown in FIG. 5. Note that, for example, a processing result in which the image of the page 1 and the image of the page 2 are shown in different pages may be obtained from the image data 510 and the display image 522.

In addition, the display image 523 is a specific example of a display image which shows N pages (N is natural number), each of which is at least a portion of the target image including the plurality of pages. The display image 523 shown in FIG. 5 includes two display images which are a display image showing the page 3 in the target image including pages 1 to 4 and a display image showing the page 4 in the target image including pages 1 to 4.

The scanning process unit 20 of the image processing apparatus 100 may sequentially perform a scanning process with respect to the display image of the page 3 constituting the display image 523 shown in the FIG. 5 and the display image of the page 4 constituting the display image 523 shown in the FIG. 5 such that scan data related to the display image of the page 3 and scan data related to the display image of the page 4 are sequentially acquired.

Furthermore, for example, in a case where scan data corresponding to the page 3 of the display image 523 shown in FIG. 5 and scan data corresponding to the page 4 are sequentially acquired, the image processing unit 40 performs image processing in which data corresponding to the page 3 and the page 4 is extracted from the image data 510 and images corresponding to the page 3 and the page 4 are formed. The image processing unit 40 may form an aggregation image in which N images corresponding to the N pages (N is natural number) are shown within one page.

For example, an image processing result 533 in which an image of the page 3 and an image of the page 4 are shown within one page may be obtained from the image data 510 and the display image 523 in this manner, as shown in FIG. 5. Note that, for example, a processing result in which the image of the page 3 and the image of the page 4 are shown in different pages may be obtained from the image data 510 and the display image 523.

Figure 6:
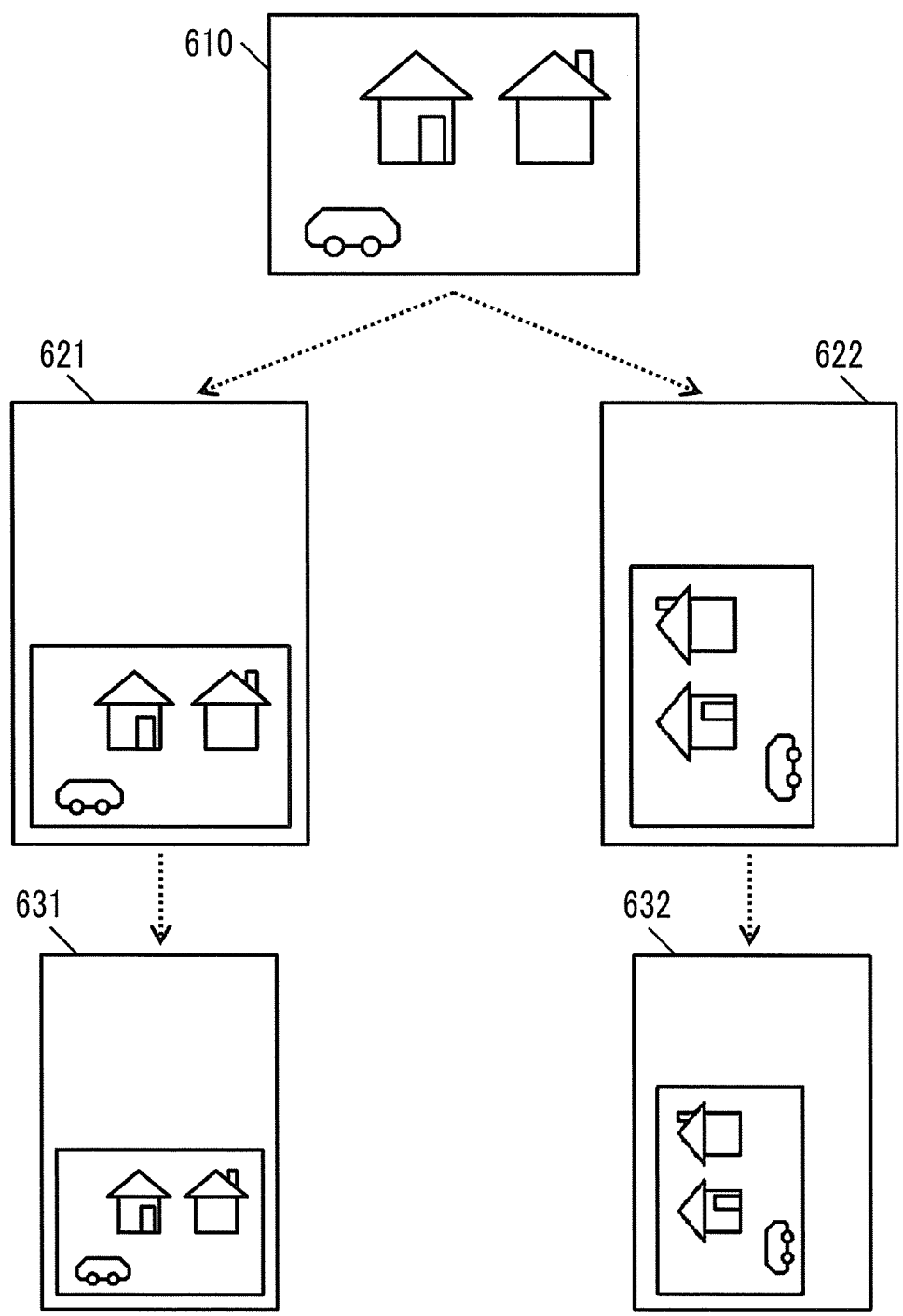
FIG. 6 is a diagram illustrating a specific example of image processing about the disposition of the target image.

FIG. 6 is a diagram illustrating a specific example of image processing about the disposition of a target image. The image processing apparatus 100 may acquire scan data of the display image showing the target image state related to the target image, analyze the scan data to obtain information about the disposition of the target image in the display image, and perform image processing in which the display image is disposed in an output image, which is formed using the image data of the target image, in imitation of the disposition of the target image in the display image.

FIG. 6 illustrates a specific example of image data 610 of a target image which is the target of image processing. In addition, FIG. 6 illustrates specific examples of display images 621 and 622 each of which shows desired disposition related to the target image, as the target image state related to the target image.

The display image 621 is a specific example of a display image that shows the position at which the target image is disposed. The image processing unit 40 of the image processing apparatus 100 may perform image processing in which the target image formed from the image data is disposed at a position in an output image that corresponds to the position of the target image in the display image, for example. For example, in a case where scan data of the display image 621 shown in FIG. 6 is obtained, the image processing unit 40 may cause the target image formed from the image data 610 to be disposed at a position in the output image that corresponds to the position of the target image in the display image 621 such that an image processing result 631 as shown in FIG. 6 is obtained, for example.

In addition, the display image 622 is a specific example of a display image in which the target image is disposed while being rotated. The image processing unit 40 may perform image processing in which the target image formed from the image data is rotated at the rotation angle of the target image in the display image and the target image is disposed in the output image. For example, in a case where scan data of the display image 622 shown in FIG. 6 is obtained, the image processing unit 40 may cause the target image formed from the image data 610 to be disposed in the output image while being rotated at the rotation angle of the target image in the display image 622 such that an image processing result 632 as shown in FIG. 6 is obtained.

Incidentally, in the display image 622 shown in FIG. 6, the target image rotated leftward at an angle of 90 degrees is at a position on a lower left side in the display image 622. In addition, in the image processing result 632 which is obtained in imitation of the disposition of the target image in the display image 622, the target image rotated leftward at an angle of 90 degrees is at a position on a lower left side in the output image. As in the specific example shown in FIG. 6, the image processing unit 40 may obtain the image processing result 632 in which the target image is disposed in the output image, which is formed by means of the image data 610 of the target image, with both of the rotation angle and the position of the target image adjusted in imitation of the disposition of the target image in the display image 622.

Figure 7:
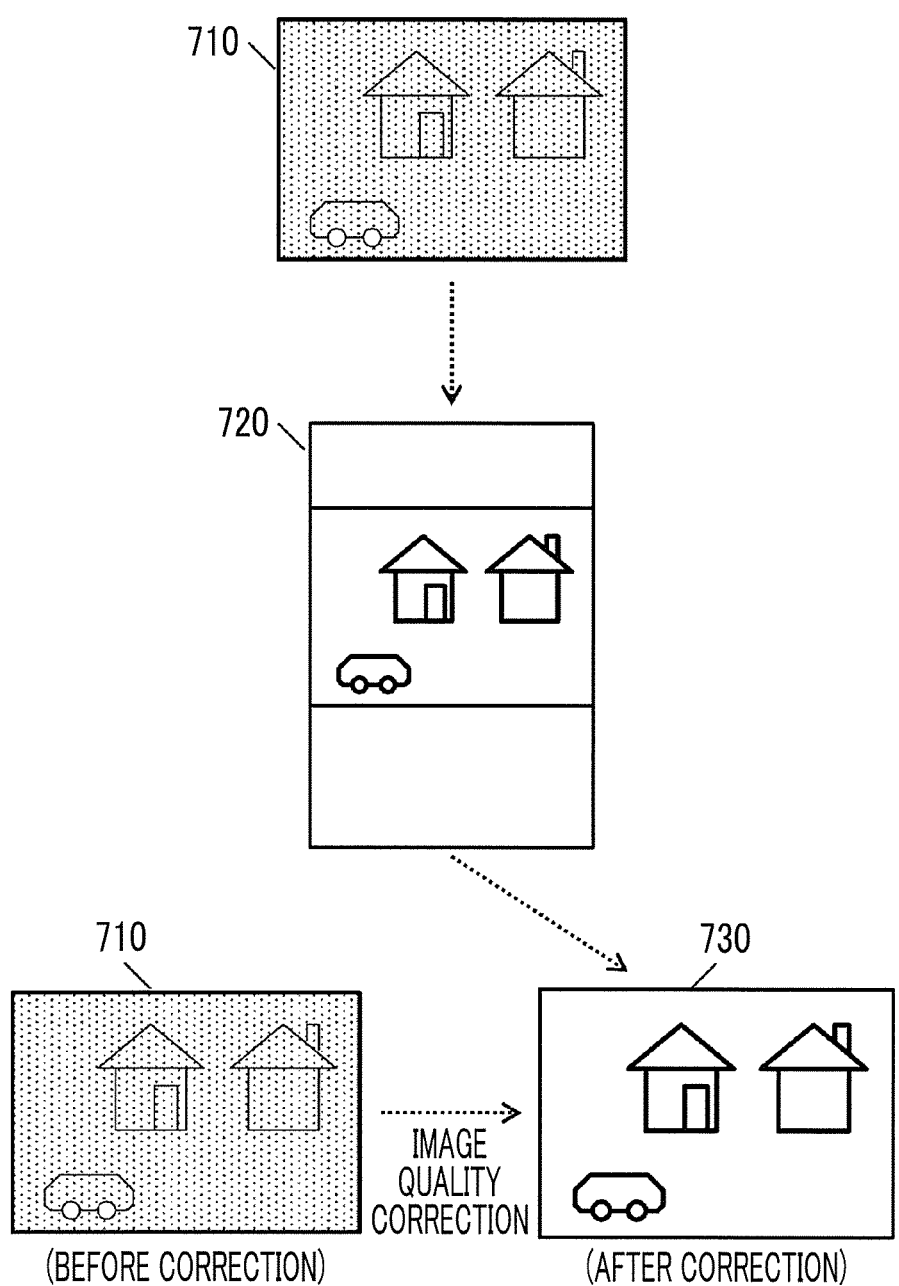
FIG. 7 is a diagram illustrating a specific example of image quality correction related to the target image.

FIG. 7 is a diagram illustrating a specific example of image quality correction related to the target image. The image processing apparatus 100 may acquire scan data of the display image showing the target image state related to the target image, analyze the scan data to obtain information about the image quality of the target image in the display image, and perform a correction process with respect to the image data of the target image such that the image quality of the target image in the display image is realized.

FIG. 7 illustrates a specific example of image data 710 of a target image which is the target of image processing. In addition, FIG. 7 illustrates a specific example of a display image 720 showing a desired image quality related to the target image, as the target image state related to the target image.

For example, the user using the image processing system in FIG. 1 may cause the display device of the information terminal apparatus 200 display the target image and operate the display device of the information terminal apparatus 200 such that the display image 720, in which parameters such as the luminance, the lightness, and the chroma of the target image which are related to the image quality of the target image have been adjusted to suit the user's taste, is formed.

Note that, the display image 720 may be an image printed on a medium such as a paper sheet.

In addition, for example, in a case where scan data of the display image 720 shown in FIG. 7 is obtained, the image processing unit 40 of the image processing apparatus 100 may perform a correction process with respect to the image data 710 of the target image such that the image quality of the display image 720 is realized and an image processing result 730 as shown in FIG. 7 is obtained, for example. As in the specific example shown in FIG. 7, the image processing result 730 in which the image quality shown in the display image 720 has been realized may be obtained from the image data 710.

Figure 8:
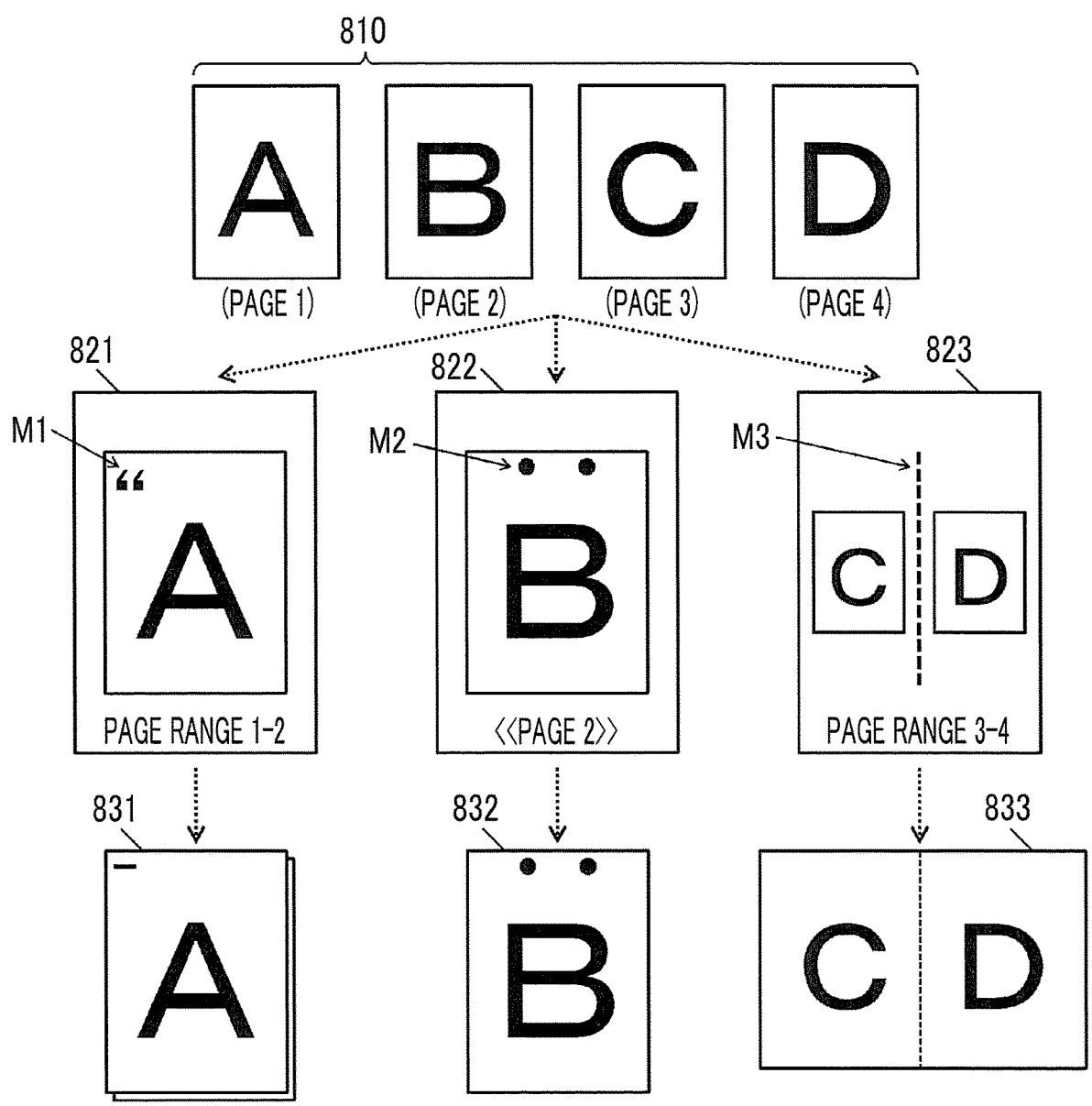
FIG. 8 is a diagram illustrating a specific example of image processing including a finishing process.

FIG. 8 is a diagram illustrating a specific example of image processing including a finishing process. The image processing apparatus 100 may acquire scan data of the display image showing the target image state related to the target image and analyze the scan data to obtain instruction information about image processing shown in the display image such that image processing designated by the instruction information is performed with respect to the image data of the target image.

FIG. 8 illustrates a specific example of image data 810 of a target image which is the target of image processing. FIG. 8 illustrates the image data 810 of the target image including a plurality of pages, which are pages 1 to 4. In addition, FIG. 8 illustrates specific examples of display images 821, 822, and 823 that include markers corresponding to one or more finishing processes as the instruction information about image processing.

The display image 821 includes a marker M1 corresponding to a stapling process, which is an example of the finishing processes. In addition, the display image 821 shows two pages, which are the page 1 and the page 2 (page range of 1 to 2) in the target image including the pages 1 to 4.

For example, in a case where scan data of the display image 821 shown in FIG. 8 is obtained, the image processing unit 40 of the image processing apparatus 100 performs image processing in which data corresponding to the page 1 and the page 2 is extracted from the image data 810 and images corresponding to the page 1 and the page 2 are formed. In addition, the analysis process unit 30 of the image processing apparatus 100 analyzes the scan data of the display image 821 to specify a stapling process, which is a finishing process corresponding to the marker M1. In addition, the image processing apparatus 100 (for example, image processing unit 40 or image outputting unit 42) performs the stapling process corresponding to the marker M1 shown in the display image 821.

In this manner, an image processing result 831 obtained by stapling two processing results in which the image of the page 1 and the image of the page 2 are shown in different pages may be obtained from the image data 810 and the display image 821, as shown in FIG. 8.

In addition, the display image 822 includes a marker M2 corresponding to a punching process, which is an example of the finishing processes. Furthermore, the display image 822 shows the page 2 in the target image including the pages 1 to 4.

For example, in a case where scan data of the display image 822 shown in FIG. 8 is obtained, the image processing unit 40 performs image processing in which data corresponding to the page 2 is extracted from the image data 810 and an image corresponding to the page 2 is formed. In addition, the analysis process unit 30 analyzes the scan data of the display image 822 to specify a punching process, which is a finishing process corresponding to the marker M2. In addition, the image processing unit 40 or the image outputting unit 42 performs the punching process corresponding to the marker M2 shown in the display image 822.

In this manner, an image processing result 832 obtained by performing the punching process on positions in a page showing the image of the page 2 that correspond to the marker M2 in the display image 822 may be obtained from the image data 810 and the display image 822 as shown in FIG. 8.

In addition, the display image 823 includes a marker M3 corresponding to a creasing process, which is an example of the finishing processes. Furthermore, the display image 823 shows two pages, which are the page 3 and the page 4 (page range of 3 to 4) in the target image including the pages 1 to 4.

For example, in a case where scan data of the display image 823 shown in FIG. 8 is obtained, the image processing unit 40 performs image processing in which data corresponding to the page 3 and the page 4 is extracted from the image data 810 and images corresponding to the page 3 and the page 4 are formed. In addition, the analysis process unit 30 analyzes the scan data of the display image 823 to specify a creasing process, which is a finishing process corresponding to the marker M3. In addition, the image processing unit 40 or the image outputting unit 42 performs the creasing process corresponding to the marker M3 shown in the display image 823.

In this manner, an image processing result 833 obtained by performing the creasing process on a position between the image of the page 3 and the image of the page 4 within one page showing the image of the page 3 and the image of the page 4 may be obtained from the image data 810 and the display image 823, as shown in FIG. 8.

Note that, although the stapling process, the punching process, and the creasing process have been described as an example of the finishing processes in FIG. 8, a marker corresponding to a finishing process (for example, bookbinding process or offset-discharging process) other than those described above may be used such that a finishing process corresponding to the marker is performed.

Figure 9:
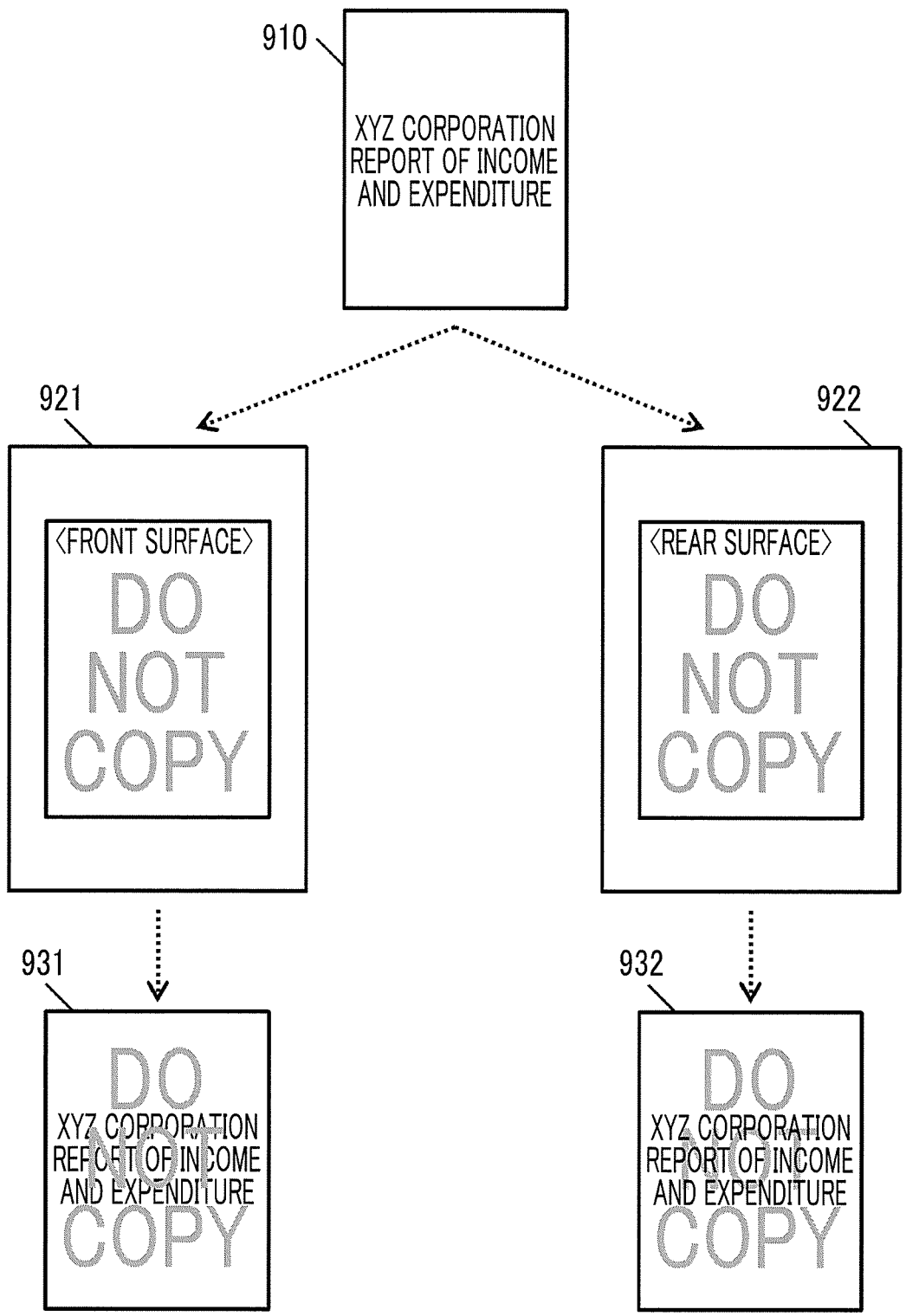
FIG. 9 is a diagram illustrating a specific example of image processing in which a watermark is added.

FIG. 9 is a diagram illustrating a specific example of image processing in which a watermark is added. The image processing apparatus 100 may acquire scan data of the display image including, as instruction information, information designating a water mark, analyze the scan data, and perform image processing in which the watermark designated by the instruction information is added with respect to the image data of the target image.

FIG. 9 illustrates a specific example of image data 910 of a target image which is the target of image processing. In addition, FIG. 9 illustrates specific examples of display images 921 and 922 including, as instruction information about image processing, information designating a watermark.

The display image 921 includes information about an instruction to add a text of "DO NOT COPY", as a watermark, to a front surface of the image data 910. Note that, the target image (image of image data 910) may be displayed in the display image 921.

For example, in a case where scan data of the display image 921 shown in FIG. 9 is obtained, the image processing unit 40 of the image processing apparatus 100 performs image processing in which a text of "DO NOT COPY" is added to a front surface of the target image formed from the image data 910, as a watermark. In this manner, an image processing result 931 as shown in FIG. 9 may be obtained.

In addition, the display image 922 includes information about an instruction to add a text of "DO NOT COPY", as a watermark, to a rear surface of the image data 910. Note that, the target image (image of image data 910) may be displayed in the display image 922.

For example, in a case where scan data of the display image 922 shown in FIG. 9 is obtained, the image processing unit 40 performs image processing in which a text of "DO NOT COPY" is added to a rear surface of the target image formed from the image data 910, as a watermark. In this manner, an image processing result 932 as shown in FIG. 9 may be obtained.

Hereinabove, an example of a specific exemplary embodiment of the present invention has been described. However, the above-described specific example is merely an example in all respects and the scope of the present invention is not limited thereto. The present invention includes various modified forms without departing from the spirit of the invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
   a memory and a processor, wherein the processor is configured to
     acquire image data of a target image, wherein the acquired image data of the target image is stored in the memory, and the target image is an image for image processing;
     acquire a scan data of a display image that is displayed in a display device, wherein the scan data of the display image shows a target image state related to the target image;
     determine image processing corresponding to the target image state by analyzing the scan data of the display image; and
     perform the determined image processing on the stored image data of the target image.

2. The image processing apparatus according to claim 1, wherein the processor is further configured to acquire the scan data of the display image displayed in the display device, wherein the scan data of the display image shows a partial image which is a portion of the target image and perform the determined image processing in which an image corresponding to the partial image is formed from the image data of the target image.

3. The image processing apparatus according to claim 2, wherein the processor is further configured to acquire the scan data of the display image in which the partial image is enlarged and form an image corresponding to the enlarged partial image from the image data of the target image.

4. The image processing apparatus according to claim 2, wherein the processor is further configured to form the partial image from the image data of the target image and perform the determined image processing in which the partial image is increased or decreased in size.

5. The image processing apparatus according to claim 3, wherein the processor is further configured to form the partial image from the image data of the target image and perform the determined image processing in which the partial image is increased or decreased in size.

6. The image processing apparatus according to claim 1, wherein the processor is further configured to acquire the scan data of the display image, wherein the target image includes a plurality of pages, and the display image shows at least one page or more pages from the plurality of pages in the target image, and
the processor is further configured to perform the determined image processing in which an image corresponding to the at least one page or more pages of the plurality of pages shown in the display image is formed from the image data of the target image.

7. The image processing apparatus according to claim 2, wherein the processor is further configured to acquire the scan data of the display image, wherein the target image includes a plurality of pages, and the display image shows at least one page or more pages from the plurality of pages in the target image, and
the processor is further configured to perform the determined image processing in which an image corresponding to the at least one page or more pages of the plurality of pages shown in the display image is formed from the image data of the target image.

8. The image processing apparatus according to claim 3, wherein the processor is further configured to acquire the scan data of the display image, wherein the target image includes a plurality of pages, and the display image shows at least one page or more pages from the plurality of pages in the target image, and
the processor is further configured to perform the determined image processing in which an image corresponding to the at least one page or more pages of the plurality of pages shown in the display image is formed from the image data of the target image.

9. The image processing apparatus according to claim 4, wherein the processor is further configured to acquire the scan data of the display image, wherein the target image includes a plurality of pages, and the display image shows at least one page or more pages from the plurality of pages in the target image, and
the processor is further configured to perform the determined image processing in which an image corresponding to the at least one page or more pages of the plurality of pages shown in the display image is formed from the image data of the target image.

10. The image processing apparatus according to claim 6, wherein the processor is further configured to acquire the scan data of the display image displayed in the display device, wherein the scan data of the display image shows N pages each of which is at least a portion of the target image and form an aggregation image in which N images corresponding to the N pages are shown within one page from the image data of the target image, the N being a natural number.

11. The image processing apparatus according to claim 10, wherein the processor is further configured to acquire a plurality of data items corresponding to the N pages and form the aggregation image from the image data of the target image.

12. The image processing apparatus according to claim 1,
wherein the processor is further configured to obtain information about disposition of the target image in the scan data of the display image to form an output image which is obtained by performing the determined image processing on the image data of the target image based on the disposition of the target image in the display image.

13. The image processing apparatus according to claim 12,
wherein the target image formed from the image data is disposed at a position in the output image that corresponds to a position of the target image in the scan data of the display image.

14. The image processing apparatus according to claim 12,
wherein the target image formed from the image data is rotated at a rotation angle of the target image in the scan data of the display image and the target image is disposed in the output image.

15. The image processing apparatus according to claim 1,
wherein the processor is further configured to obtain information about an image quality of the target image in the display image and perform a correction process on the image data of the target image such that the image quality of the target image in the display image is realized.

16. The image processing apparatus according to claim 1,
wherein the processor is further configured to obtain instruction information about image processing shown in the scan data of the display image to perform the image processing designated by the instruction information with respect to the image data of the target image.

17. The image processing apparatus according to claim 16,
wherein the processor is further configured to acquire the scan data of the display image including, as the instruction information, a marker corresponding to one or more finishing processes, specify a finishing process corresponding to the marker, and perform the specified finishing process on an output image obtained from the image data of the target image.

18. The image processing apparatus according to claim 16,
wherein the processor is further configured to acquire the scan data of the display image including, as the instruction information, information designating a watermark and perform image processing in which the watermark designated by the instruction information is added on the image data of the target image.

19. An image processing system comprising:
an information terminal apparatus; and
an image processing apparatus,
wherein the information terminal apparatus includes
a display that displays a display image showing a target image state, and
wherein the image processing apparatus includes a processor and a memory, wherein the processor is configured to
acquire image data of a target image wherein the acquired image data of the target image is stored in the memory, and the target image is an image for image processing,
acquire a scan data of the display image, wherein the display image is displayed on the display of the information terminal apparatus, and the display image shows the target image state related to the target image,
determine image processing corresponding to the target image state by analyzing the scan data of the display image, and
perform the determined image processing on to the stored image data of the target image.

20. A non-transitory computer readable medium storing a program causing a computer to:
acquire image data of a target image, wherein the target image is an image for image processing;
acquire a scan data of a display image that is displayed in a display device, wherein the scan data of the display image shows a target image state related to the target image;
determine image processing corresponding to the target image state by analyzing the scan data of the display image; and
perform the determined image processing on the stored image data of the target image.

21. The image processing apparatus according to claim 1, wherein the display image displayed in the display device of the image processing apparatus or displayed in the display device of an external information terminal apparatus which depends on that a scan setting is used or not.

* * * * *